United States Patent [19]

Hauk

[11] Patent Number: 4,806,154
[45] Date of Patent: Feb. 21, 1989

[54] PROCESS FOR THE PRODUCTION OF PIG IRON FROM FINE ORE USING PLASMA BURNER

[75] Inventor: Rolf Hauk, Achern, Fed. Rep. of Germany

[73] Assignee: Korf Engineering GmbH, Dusseldorf, Fed. Rep. of Germany

[21] Appl. No.: 914,373

[22] Filed: Oct. 2, 1986

[30] Foreign Application Priority Data

Oct. 3, 1985 [DE] Fed. Rep. of Germany ....... 3535572

[51] Int. Cl.$^4$ ..................... C21B 13/12; C21B 23/00; C21B 47/00
[52] U.S. Cl. .................................. 75/10.19; 75/10.22
[58] Field of Search ................. 75/10.22, 10.20, 10.19, 75/26

[56] References Cited

U.S. PATENT DOCUMENTS

| | | | |
|---|---|---|---|
| 4,008,074 | 2/1977 | Rossner et al. | 75/38 |
| 4,073,642 | 2/1978 | Collin et al. | 75/26 |
| 4,127,406 | 11/1978 | Kreft et al. | 75/26 |
| 4,310,350 | 1/1982 | Santen | 75/10.19 |
| 4,340,420 | 7/1982 | Santen et al. | 75/10.22 |
| 4,396,421 | 8/1983 | Stift et al. | 75/10.22 |
| 4,588,437 | 5/1986 | Kepplinger et al. | 75/43 |

FOREIGN PATENT DOCUMENTS

| | | | |
|---|---|---|---|
| 200903 | 10/1985 | Japan | 75/26 |
| 2126606 | 3/1984 | United Kingdom | 75/10.22 |

*Primary Examiner*—Melvyn J. Andrews

[57] ABSTRACT

A process for the production of pig iron from fine ore is produced, in which the fine ore is prereduced in one or more reduction units (1, 2). The resulting sponge iron is subsequently melted down and finally reduced in a melt-down gasifier (3) with the aid of at least one plasma burner (9) and a solid carbonaceous reducing agent. The sponge iron is fed into the lower part of the melt-down gasifier in the vicinity of the plasma burners, preferably directly over the latter, above the collecting melting bath and slag. The solid carbonaceous material, particularly low grade coal required for final reduction is fed from above (18) into the melt-down gasifier. It is converted in the latter into coke and forms in the lower part of the gasifier a fluidized bed, which is maintained by the plasma gas, additionally introduced oxygen and CO formed during final reduction.

20 Claims, 1 Drawing Sheet

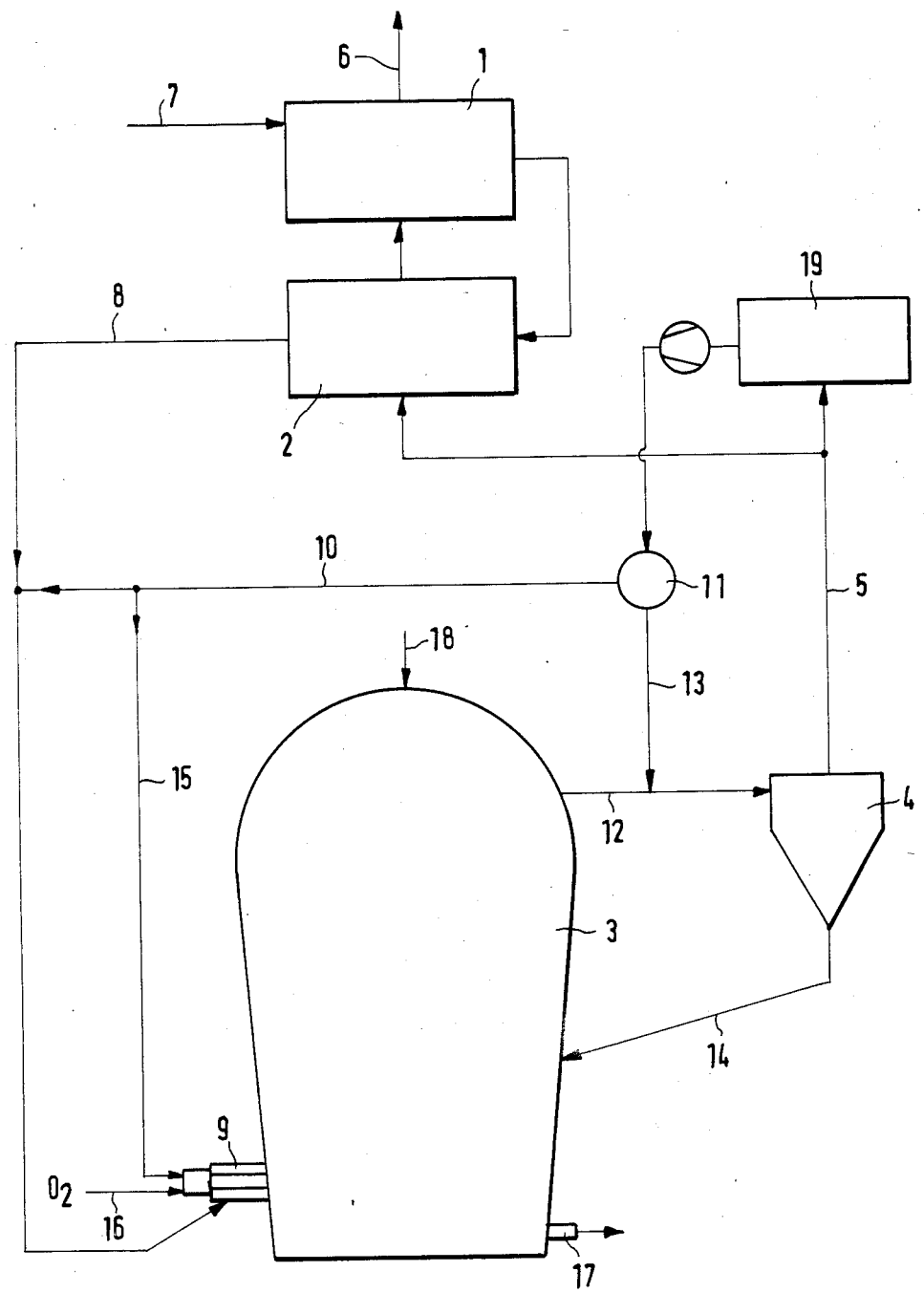

PROCESS FOR THE PRODUCTION OF PIG IRON FROM FINE ORE USING PLASMA BURNER

BACKGROUND OF THE INVENTION

The invention relates to a process for the production of pig iron from fine ore, in which the fine ore is prereduced in one or more reduction units and the resulting sponge iron is then melted down and finally reduced in a melt-down gasifier with the aid of at least one plasma burner and a solid carbonaceous reducing agent.

In a process for the reduction of iron ore, known as the plasma melt process, there is a prereduction of the iron ore and a subsequent melting reduction in a melt-down gasifier. Prereduction takes place with the aid of the gas produced in the melt-down gasifier. The prereduced sponge iron is fed into the lower part of the melt-down gasifier via the melting and slag hearth. One or more plasma burners also act in this part and supply at least part of the heat required for melting the sponge iron. The plasma burners also serve to introduce coal dust into the melt-down gasifier and this is used as the reducing agent for the sponge iron. Coke is introduced from above into the melt-down gasifier and forms a solid gas and liquid-permeable bed, in which reduction takes place. Immediately following the introduction of the sponge iron into the melting and reducing zone of the melt-down gasifier, this is melted and completely reduced. The molten iron and slag collect in the hearth provided for this purpose at the bottom of the melt-down gasifier and are removed at appropriate time intervals. This known process is subject to limitations in that the coal must be ground to dust before it can be supplied via the plasma burners and because it is necessary to use relatively expensive coke for producing and maintaining the static bed.

EP No. 0 063 924 A2 discloses a process for reducing and melting fine ore, in which a prereduction is also carried out and the prereduced ore together with the heated air is introduced laterally into the melt-down gasifier via blast nozzles. Solid carbonaceous material is introduced from above into the melt-down gasifier and forms the static bed therein. Upstream of the blast nozzles the temperature rises to approximately 2000° to 2500° C. and cavities form there in the static bed, in which the iron ore melts and is finally reduced. However, a considerable heat quantity is required for this, so that the heat supplied is often not adequate to completely melt and reduce the ore. As ore is not only blown into the lower part of the melt-down gasifier, but also and more particularly into the central part thereof, where melting takes place, the complete gasifier region below this must be kept at a temperature such that the downwardly dripping molten iron does not solidify. Thus, here again there are problems in covering the corresponding heat requirements. It is much more advantageous to supply the necessary heat by plasma burners instead of by heated air.

On the basis of the known plasma melt process, the problem of the present invention is to so improve said process that neither coke, nor ground coal are required as starting materials and instead operation is possible with coal of any type and form.

SUMMARY OF THE INVENTION

According to the invention this problem is solved by feeding the sponge iron into the lower part of the melt-down gasifier in the plasma burner region above the melting and slagging chamber, and by feeding a solid carbonaceous material from above into the melt-down gasifier and by forming a fluidized bed from coke in the gasifier.

Thus, the invention relates to a process for the production of pig iron from fine ore, in which the iron ore is prereduced in one or more reduction units and the sponge iron obtained is subsequently melted down and finally reduced in a melt-down gasifier with the aid of at least one plasma burner and a solid carbonaceous reducing agent, the sponge iron being introduced into the lower part of the gasifier in the vicinity of the plasma burner above the hearth and is characterized in that a solid carbonaceous material is fed from above into the melt-down gasifier and forms a fluidized bed from coke therein. The solid carbonaceous material is preferably converted into coke above the fluidized bed. The solid carbonaceous material is advantageously constituted by coal, particularly slow burning coal with a particle size of up to 50 mm. The fluidized bed is appropriately maintained by the upwardly flowing gas supplied via the plasma burners and the gas formed during final reduction. In addition, oxygen can be fed into the melt-down gasifier.

The sponge iron is preferably introduced into the melt-down gasifier via the actual plasma burners and after cooling the gas produced in the gasifier can be used for the transfer of the sponge iron. It can also be used as plasma gas for the plasma burners. This gas is advantageously also used for the prereduction of the iron ore after setting to an appropriate temperature.

The required electric power is preferably produced from the waste gas obtained in the present process. The degree of metallization of the prereduced iron ore is appropriately between 30 and 70% and it is recommended that the degree of metallization be chosen in such a way that the electric power obtained from the waste gas covers the entire energy needs of the process. Part of the waste gas can be used, after cooling, as plasma gas for the plasma burners.

BRIEF DESCRIPTION OF THE DRAWING

The invention is described in greater detail hereinafter relative to an embodiment illustrated by the drawing, which diagrammatically shows a plant for producing molten pig iron from fine ore.

DETAILED DESCRIPTION OF PREFERRED EMBODIMENTS

The represented plant contains as its essential components two prereduction units 1 and 2 and a melt-down gasifier 3. Prereduction takes place with the aid of the gas produced in the melt-down gasifier 3 in a manner to be described hereinafter, which has been cooled to 850° C. and cleaned in a cyclone 4. This gas, which essentially contains CO and $H_2$, flows via a pipe 5 from cyclone 4 through prereduction unit 2 and then through prereduction unit 1 and is then removed via pipe 6 as waste gas. The fine ore is supplied by means of a pipe 7 and moves in countercurrent to the reducing gas firstly through unit 1 and then through unit 2 and is then removed therefrom via pipe 8. Prereduction is performed in fluidized beds, reduction cyclones or circulating fluidized beds.

Ceramic balls are advantageously used as perforated bases for the fluidized beds. The prereduction in the two prereduction units 1 and 2 is accompanied by a calcining of the conventional fluxes to iron ore. Instead of this, it is possible to provide a separate fluidized bed stage, in which the iron ore is preheated and the fluxes calcined. The power required can be produced by the partial combustion of the gas passed through.

The prereduced fine ore and/or the sponge iron is led via pipe 8 to the plasma burners 9 in the lower part of melt-down gasifier 3. The transfer of the sponge iron takes place with the aid of a gas fed via pipe 10 into pipe 8. Pipe 10 is connected to a collecting main 11, in which is located the gas removed from cyclone 4 and then cooled in washer or scrubber 19. The gas produced in melt-down gasifier 3 is fed via pipe 12 directly into cyclone 4, where the dust is removed and it is passed via pipe 5 as reduction gas into the prereduction units 1, 2. As the gas leaves the melt-down gasifier 3 with a temperature of approximately 1000° C., but the prereduction preferably takes place at a temperature of 850° C., cooler gas from washer 19 is fed via pipe 13 by collecting main 11 into pipe 12, so that the gas entering cyclone 4 has the desired temperature of 850° C. The dust separated from the gas in cyclone 4 is returned via a pipe 14 to the melting and reducing area of melt-down gasifier 3.

The plasma burners 9 are distributed at the same height and at identical intervals over the circumference of the melt-down gasifier 3. However, it is also possible to provide a plasma burner if it supplies an adequate thermal energy. Cooled gas from washer 19 is also used as the plasma gas and it is passed from collecting main 11 via pipe 10 and a pipe 15 branching therefrom to the plasma burners 9. However, the plasma gas can also be constituted by cooled waste gas removed via pipe 6.

Oxygen is supplied to the plasma burners 9 via pipe 16 and is introduced by means of the same into the melt-down gasifier 3. However, the oxygen can also be blown in to melt-down gasifier 3 by means of nozzles separate from the plasma burners 9. By means of two tap pipes 17 the molten iron and slag collecting at the bottom of melt-down gasifier 3 are removed at given time intervals.

Coal with a particle size of preferably up to 50 mm is fed from above and by means of pipe 18 into melt-down gasifier 3. The coal drops rapidly through the free upper part of the gasifier, it being dried, degassed and thereby disintegrates. The resulting coke drops onto a coke layer kept in a fluidized bed-like state. This fluidized bed is maintained by the upwardly flowing plasma gas and the oxygen, as well as by the CO formed during the final reduction of the sponge iron. The gas collecting above the fluidized bed essentially consists of CO and $H_2$ and has a temperature of approximately 1000° C., being removed by means of pipe 12.

The sponge iron is melted in the action zone of plasma burner 9 and is completely reduced by the coke located there. The resulting molten iron and the molten slag drip down and collect at the bottom of melt-down gasifier 3. A fluidized bed height appropriate for economic operation is between 1 and 5 meters.

The coal fed in by means of pipe 18 can be of random quality. For example, it can consist of an inexpensive open burning coal of the following composition: 5% moisture, 35.7% volatile constituents, 76.6% C, 5.3% H, 8.6% O, 1.6% N and 7.3% ash; the calorific value being 30,870 kJ/kg (all values being based on the anhydrous state). If when using this coal no additional power was supplied through the plasma burners 9, then for operating the melt-down gasifier 3, the introduced sponge iron would have to be prereduced to a degree of metallization of 90%. In addition, the coal and oxygen consumption would be very high. It would also not be possible to reduce fine ore in the fluidized bed due to the caking which occurs.

Prereduction is set in such a way that the degree of metallization of the sponge iron fed into the melt-down gasifier 3 is between 30 and 70%. Particular recommendation is given to a degree of metallization such that the system is self-sufficient in energy or power. The waste gas removed by means of pipe 6 is at least partly used for power production purposes and system autarchy exists if the thus obtained power quantity is sufficient to cover the power requirements for the plasma burners, oxygen production and other consuming means or loads used for the process. This state is achieved with the aforementioned open burning coal at a degree of metallization of the prereduction of 70%. Using 625 kg of coal and 305 $m^3$ of oxygen, 1200 $m^3$ of gas usable for prereduction are produced in melt-down gasifier 3. The plasma burners operating with an efficiency of 90% must be supplied with 470 kWh/t.

In the case of a degree of metallization of the prereduction of 50%, an external power supply of 450 kWh/t would be necessary in the case of a coal consumption of 460 kg and an oxygen consumption of 244 $m^3$/t.

Thus, in the present process, by the choice of the degree of metallization achieved during prereduction it is possible to set an optimum ratio between the gas quantity produced, the electric power cunsumption, as well as the coal and oxygen consumption. There are no limitations with respect to the quality of the coal used and the ore to be reduced can be present in dust form and preferably manganese, chrome and nickel-containing ores can be used.

I claim:

1. A method of producing pig iron, comprising the steps of: reducing fine ore to sponge iron in at least one reduction unit, feeding coal having a particle size of up to 50 millimeters into a top portion of a melt-down gasifier so that the coal falls into a lower portion of the melt-down gasifier and forms a fluidized bed of coke in the lower portion, feeding the sponge iron from the at least one reduction unit laterally directly into the lower portion of the melt-down gasifier, melting down and reducing the sponge iron to pig iron in said lower portion by the coke in the fluidized bed and by a plasma gas introduced into the lower portion by plasma burner means, removing the pig iron from the melt-down gasifier, and removing reaction gas produced in the melt-down gasifier at the top portion.

2. A method according to claim 1, wherein the coal is open burning coal.

3. A method according to claim 1, comprising adding gas obtained during the step of reducing the fine iron ore into sponge iron with the plasma gas into the lower portion of the melt-down gasifier.

4. A method according to claim 1, wherein the fluidized bed has a height of between 1 and 5 meters.

5. A method according to claim 1, comprising feeding the sponge iron into the melt-down gasifier via said plasma burner means.

6. A method according to claim 1, comprising introducing oxygen into the fluidized bed.

7. A method according to claim 6, comprising introducing the oxygen via the plasma burner means.

8. A method according to claim 1, comprising cooling the reaction gas removed from the melt-down gasifier, and reducing the fine ore to sponge iron with the thus cooled reaction gas.

9. A method according to claim 1, comprising cooling the reaction gas removed from the melt-down gasifier, and transporting the sponge iron into the melt-down gasifier with the thus cooled reaction gas.

10. A method according to claim 1, comprising cooling the reaction gas removed from the melt-down gasifier, and operating the plasma burner means with the thus cooled reaction gas.

11. A method according to claim 1, wherein the fine iron ore is reduced to sponge iron with a degree of metalization of 30 to 70%.

12. A method according to claim 11, wherein the degree of metalization is 50%.

13. A method according to claim 1, comprising the step of separating any dust contained in the reaction gas therefrom and returning the dust to the fluidized bed.

14. A method according to claim 13, wherein the dust is returned via the plasma burner means.

15. A method according to claim 1, comprising calcining fluxes to fine iron ore simultaneously with reducing the fine iron ore to sponge iron.

16. A method according to claim 1, comprising calcining fluxes to fine iron ore in a fluidized bed prior to reducing the fine iron ore.

17. A method according to claim 1, wherein the fine iron ore is a chrome-containing and nickel-containing iron ore.

18. A method according to claim 1, wherein the fine iron ore is a manganese-containing iron ore.

19. A method according to claim 8, comprising producing electric power with waste gas obtained as a result of the reduction of the fine iron ore to sponge iron, and using the electric power to operate the method.

20. A method according to claim 19, wherein the fine iron ore is reduced to sponge iron with a degree of metalization such that the electric power is sufficient to operate the method.

* * * * *